United States Patent
Ishigami (10) Patent No.: US 6,625,445 B1
(45) Date of Patent: Sep. 23, 2003

(54) DATA TRANSFER METHOD AND SYSTEM

(75) Inventor: Masahiro Ishigami, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/404,312

(22) Filed: Sep. 24, 1999

(30) Foreign Application Priority Data

Sep. 25, 1998 (JP) .......................................... 10/271028

(51) Int. Cl.[7] .............................................. H04M 3/00
(52) U.S. Cl. ........................ 455/419; 455/403; 455/88; 455/572; 455/557
(58) Field of Search ........................ 455/88, 572, 557, 455/419, 403

(56) References Cited

U.S. PATENT DOCUMENTS 6,144,848 A  *  11/2000  Walsh et al. ................. 235/379

FOREIGN PATENT DOCUMENTS

| EP | 0855822 | * | 7/1998 |
|----|---------|---|--------|
| GB | 2 301 987 | | 12/1996 |
| JP | 8-101843 | | 4/1996 |
| JP | 9-284379 | | 10/1997 |
| JP | 411103364 | * | 4/1999 |
| WO | WO 97/35453 | * | 9/1997 |

* cited by examiner

*Primary Examiner*—Dwayne Bost
*Assistant Examiner*—David Nguyen
(74) *Attorney, Agent, or Firm*—Sughrue Mion, PLLC (57) ABSTRACT

A data transfer method for reducing the burden on a mobile communication device is disclosed. Phone directory data is stored in a computer. When transferring phone directory data from the computer to a mobile communication device, it is determined whether the processing power of the mobile communication device is large enough to produce desired search tables from the phone directory data. If the processing power is large enough, the phone directory data is sequentially transferred to the mobile communication device. If no such processing power is available, the computer produces the desired search tables and the phone directory data having the desired search tables added thereto is sequentially transferred to the mobile communication device.

12 Claims, 6 Drawing Sheets

PHONE DIRECTORY DATA RECORD P

| MSB | | LSB | |
|---|---|---|---|
| REF. NO. | | | 1ST OCTET |
| TEL NUM. 1 | | | 2ND OCTET |
| TEL NUM. 2 | | | 3RD OCTET |
| TEL NUM. 3 | | | 4TH OCTET |
| NAME 1 | | | 5TH OCTET |
| NAME 2 | | | 6TH OCTET |
| NAME 3 | | | 7TH OCTET |

FIG. 2B

PHONE DIRECTORY DATA RECORD $P_T$

| MSB | | LSB | |
|---|---|---|---|
| REF. NO. | | | 1ST OCTET |
| TEL NUM. SEARCH TABLE | | | 2ND OCTET |
| TEL NUM. 1 | | | 3RD OCTET |
| TEL NUM. 2 | | | 4TH OCTET |
| TEL NUM. 3 | | | 5TH OCTET |
| NAME SEARCH TABLE | | | 6TH OCTET |
| NAME 1 | | | 7TH OCTET |
| NAME 2 | | | 8TH OCTET |
| NAME 3 | | | 9TH OCTET |

DATA TRANSFER METHOD AND SYSTEM

BACKGROUND OF THE INVENTION

1. Field of the invention

The present invention relates to transfer of data between two information processing devices, and more particularly to a method and system for transferring data to be searched such as phone directory data.

2. Description of the Related Art

There has been proposed a data transfer method for transferring phone directory data from a mobile telephone to another mobile telephone, for example, one which has been newly bought, in Japanese Patent Application Laid-Open Publication No. 9-284379. The phone directory data that has theretofore been accumulated can be easily used in a new mobile telephone without manually inputting the data again.

In general, phone directory data includes approximately 100 to 700 entries in a single mobile telephone. And with respect to one name are allotted a plurality of telephone numbers, for example, of his company, his home, and his FAX, and the like. Recently, e-mail addresses have been also included, with the result that the level of convenience has increased while, on the other hand, it is considered that the amount of data will increase more and more in the future. Such a large amount of phone directory data becomes useful data only after search processing has been performed thereon. However, in order to perform search processing with a high speed, it is necessary to use a large capacity of cash memory or a command system that makes it easy to process strings of character.

As well known, in the mobile communication device such as a mobile telephone, since the long-term use thereof is intended to be realized, it is difficult to increase the power of the processor (CPU) up to a level that is higher than the required level. Concretely, when selecting the CPU, the cash memory is regarded as not being preferable because of its size, cost, and power consumption. The character-string processing is extremely less often used compared to the communication protocol and therefore in many cases has such a processing function deleted. For this reason, the search processing for managing a phone directory imposes a large burden on the CPU and so this search processing cannot be completed in a short period of time.

On this account, there has been generally adopted a method wherein a search table is provided in units of an object area of the phone directory data to be searched. More specifically, each time the phone directory data is updated, these search tables are newly re-arranged: and when a display is made, the phone directory data is read out according to the sequential order of the search table data and the read-out data is displayed on the screen. An example of the method such that high-speed search is performed by providing search tables for use on search is disclosed in Japanese Patent Application Laid-Open Publication No. 8-101843.

In the case where a user manually input phone directory data on a case-by-case basis, the CPU can produce search tables with a sufficiently high speed. However, in the case of phone directory data collectively received from another information processing device, the processing load of the CPU on the receiving side becomes extremely large because the speed of inputting is a lot higher than that of manual inputting and the amount of data is also larger. Therefore, even after transfer of data, the CPU is partly occupied because of producing search tables. As a result of this, a delay occurs in the execution of the communication processing that the CPU should perform. When viewed from the user's side, it may be such a delay in responding to the user's operation that the user's patience is exhausted.

SUMMARY OF THE INVENTION

An object of the present invention is to provide a data transfer method and system that can transfer data to be searched from one device to another device at a high speed without excessively increasing in burden on the receiving side.

According to the present invention, a method for transferring a plurality of units of data to be searched from a first device to a second device through an interface, each of the first and second devices having a search function, the method comprising the steps of: a) storing the plurality of units of data in the first device; b) determining whether the second device currently has processing power enough large to produce a desired search table from the plurality of units of data; and c) transferring the plurality of units of data from the first device to the second device in such a way that the desired search table is added to the plurality of units of data when the second device does not currently have the processing power enough large to produce the desired search table from the plurality of units of data.

According to the present invention, the first device comprises: a first storage for storing the plurality of units of data; a first searcher for producing a desired search table from the plurality of units of data in response to a search table production request from the second device: and a first data processor for transmitting the plurality of units of data to the second device when the search table production request has not been received and transmitting the plurality of units of data having the search table added thereto when the search table production request has been received. The second device comprises: a second storage for storing the plurality of units of data; a second searcher for producing a desired search table from the plurality of units of data stored in the second storage; and a second data processor for determining whether processing power is currently enough large to produce a desired search table from the plurality of units of data to be received from the first device, transmitting the search table production request to the first device to receive the plurality of units of data having the desired search table added thereto when the second device does not currently have the processing power enough large to produce the desired search table from the plurality of units of data.

As described above, according to the present invention, in the case where transferring data from the first device to the second device, it is determined whether the second device has processing power large enough to produce a desired search table. If there is sufficient processing power in the second device, the data is transferred as it is to the second device. If there is not sufficient processing power, a desired search table is produced at the first device and data having the produced search table added thereto is transferred to the second device. In this way, by leaving the production of search tables to the first device as necessary, it is possible to avoid an excessive load on the second device and thereby an undesired delay in other processing at the second device can be eliminated.

Whether the second device has the enough processing power can be determined by measuring the occupied time period or idle time period of the processor (such as a CPU) of the second device. Since the idle time period of the processor momentarily changes, it is desirable to perform this decision at the time when transfer of data is about to be performed from the first device to the second device.

Preferably, the second device is a mobile communication device such as a mobile telephone. This is because such a mobile device is intended to have promoted its miniaturization and the decrease in its power consumption and therefore inputting of data is not easy compared to an ordinary computer such as a notebook computer and desk-top computer. Therefore, in general, the processing power of the processor provided in the mobile communication device is not enough to do search processing while doing other communication processing.

DETAILED DESCRIPTION OF THE PREFERRED EMBODIMENT

Figure 1:
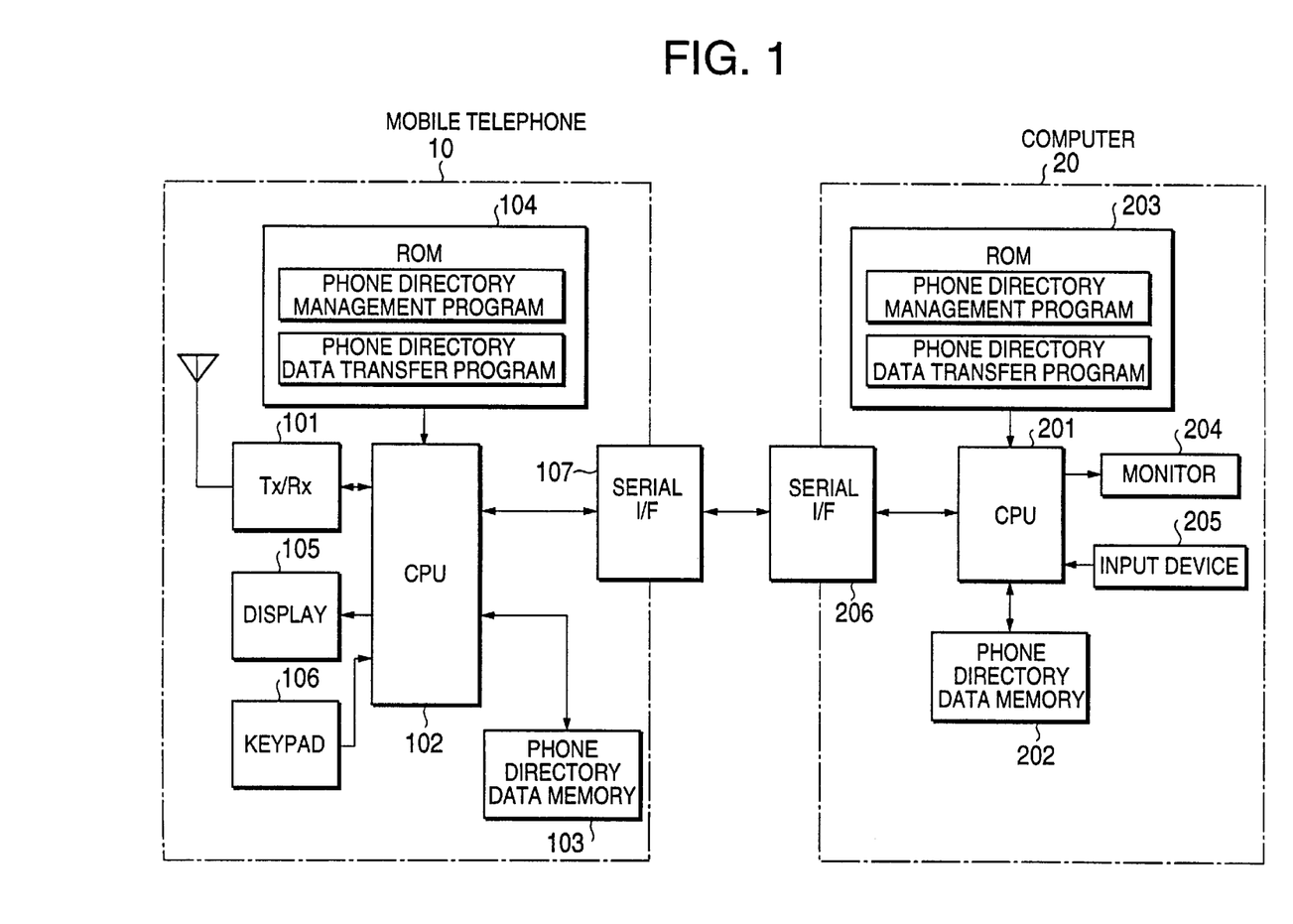
FIG. 1 is a block diagram illustrating an embodiment of a data transfer system according to the present invention.

Referring to FIG. 1, a mobile telephone 10 is connected to a computer 20 via a serial interface and the case where phone directory data is transferred from the computer 20 to the mobile telephone 10 will be described. The same applies even when using another mobile telephone instead of the computer 20. Further, the interface is not limited to a serial interface, and may be a parallel interface. Depending on the cases, it is also possible to utilize radio communication. In this embodiment, a serial interface that can be most generally utilized is exemplified.

In FIG. 1, the mobile telephone 10 has a transmission and reception (Tx/Rx) system 101 that enables the communication with a base station (not illustrated) by radio. The transmission and reception system 101 is controlled by a program-controlled processor 102 (here, central processing unit: CPU). Further, the mobile telephone 10 is provided with a phone directory data memory 103 for storing phone directory data which has been accumulated. The phone directory data memory 103 may be formed as a memory area of a random access memory (RAM).

The processor 102 controls the entire operation of the mobile telephone 10 by executing a control program that has been stored in a read only memory (ROM) 104. In this embodiment, the ROM 104 also stores, in addition to the communication control program, a phone directory management program for managing the phone directory data and a phone directory data transfer program for controlling the transfer of the phone directory data.

The mobile telephone 10 is provided with a display 105 and a keypad 106. The display 105 displays necessary information under control of the processor 102 and the keypad 106 is used to input telephone numbers and various commands. The display 105 is preferably a low-power display device such as a liquid crystal display (LCD). As the mobile telephone 10 decreases in size, the display area of the display 105 also becomes smaller. In this embodiment, it is possible to display several tens of characters or so. Also, the keypad 106 includes a ten-key pad. In many cases, the keys concurrently serve both as a numeric character input key and alphabetical character input keys so that a larger amount of information can be input with a smaller number of keys.

The mobile telephone 10 is provided with a serial interface 107 for enabling the serial data communication with an external information processing device. This serial interface 107 is also used for data transfer that is made with the computer 20. As described later, the processor 102 stores the data that has been received from the interface 107 into the phone directory data memory 103 as it is or in a form wherein a search table is added thereto according to the phone directory data transfer program. The search table generating function is contained in the phone directory management program stored in the ROM 104.

For example, when a user inputs a keyword for making a search from the keypad 106, the processor 102 starts the phone directory management program, then searches the phone directory data memory 103 according to the keyword that has been input. If a hit is found in the phone directory data, it is displayed on the display 105.

The computer 20 is provided with a processor (CPU) 201, a phone directory data memory 202, and a ROM 203. The processor 201 can realize the same function as that of the mobile telephone 10 by executing the phone directory management program and phone directory data transfer program that have been stored in the ROM 203.

Further, the computer 20 is provided with a monitor 204 for displaying necessary information and an input device 205 for inputting telephone numbers, various commands, data, and the like. As the monitor 204 is used a CRT-type monitor having a display area that can display 100 or more characters, or a LCD device of the same size. The input device 205 may be a keyboard having keys the number of which is larger than the number of the keys of an ordinary typewriter and a pointing device such as a mouse. Since the computer 20 is equipped with such a monitor 204 and input device 205, the inputting operation of the telephone numbers, the names, and the like is much easier than in the case of the mobile telephone 10.

The computer 20 is provided with a serial interface 206 for enabling the data communication with an external device, and is also used for data transfer that is made with the mobile telephone 10 in this embodiment. As described later, when a user inputs data from the input device 205 following a format displayed on the monitor 204, the processor 201 starts the phone directory management program and stores the input data into a phone directory data memory 202. And in response to a request from the mobile telephone 10, the computer 20 transmits the phone directory data to the mobile telephone 10 via the serial interface 206 as it is or in a form wherein a search table is added to it. The search table generating function is contained in the phone directory management program stored in the ROM 203.

Figure 2A:
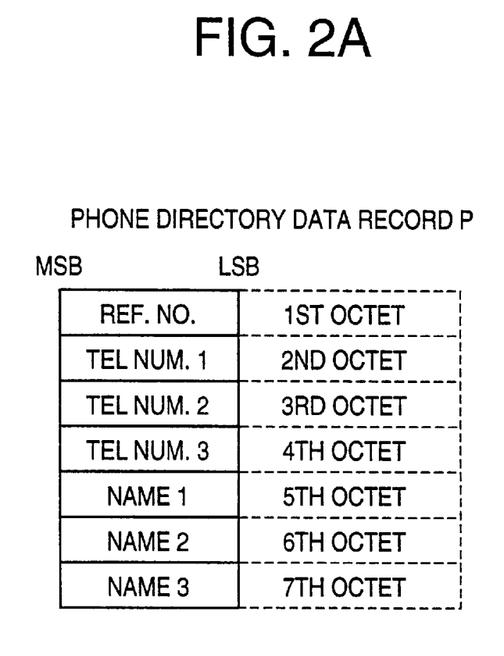
FIG. 2A is a diagram illustrating an example of data stream format of one record in the phone directory data.

As shown in FIG. 2A, which is simplified for the purpose of avoiding the complexity, reference numbers correspond to pages of a phone directory, and a single reference number indicates a record of data corresponding to one person. Here, it is assumed for simplicity that a reference number field has one octet (8 bits). A record corresponding to one entry is a collection of fields: Reference Number; Telephone Numbers; and Names. The collection of reference number data, telephone number data, and name data is sequentially transferred in octets as shown in FIG. 2A. The phone directory data is composed of the same number of records as the number of the registered persons.

Figure 2B:
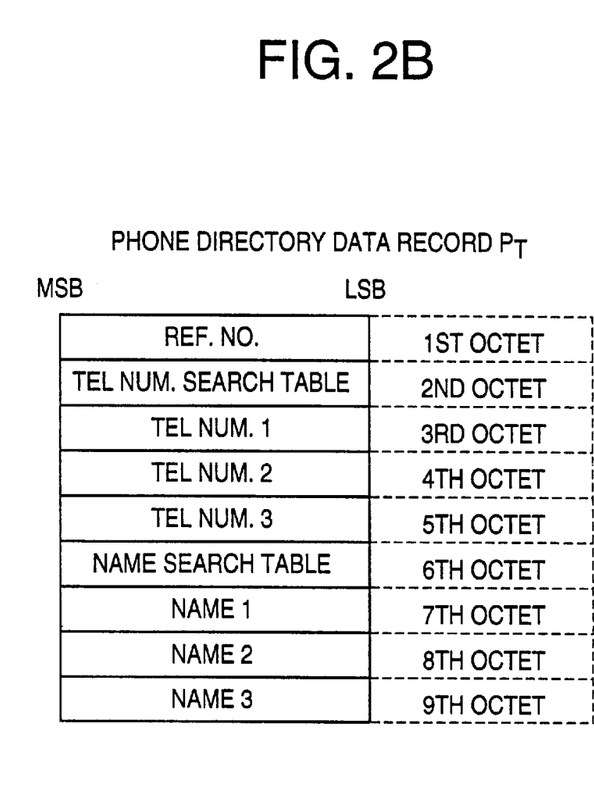
FIG. 2B is a diagram illustrating an example of data stream format of one record in the phone directory data having search tables added thereto.

Referring to FIG. 2B, in addition to the data stream as shown in FIG. 2A, in the second octet area between the reference number and the telephone number-1, a telephone number search table is stored; and in the sixth octet area between the telephone number-3 and the name-1, a name search table is stored. To be more precise, a serial number of data in the telephone number search table is stored in the second octet area and a serial number of data in the name search table is stored in the sixth octet area.

A search table is produced in one of the mobile telephone 10 and the computer 20 and it is determined by the mobile telephone 10 which one produces the search table. As described above, producing a search table is to sort the records of phone directory data in accordance with the sequential order of the telephone numbers or the alphabetic order of the names. Therefore, the production of a search table provides a large magnitude of load on the processor 102 of the mobile telephone 10. Accordingly, it is better to avoid that the processor 102 executes the process involving such a large magnitude of load in parallel with other processes. In the present invention, the search table production processing is left to the computer 20 by the mobile telephone. Therefore, the mobile telephone 10 can receive the phone directory data having a search table added thereto from the computer 20 and can store it into the phone directory data memory 103. Hereinafter, a more detailed explanation will be given of the production of the search tables.

SEARCH TABLE PRODUCTION

Figure 3:
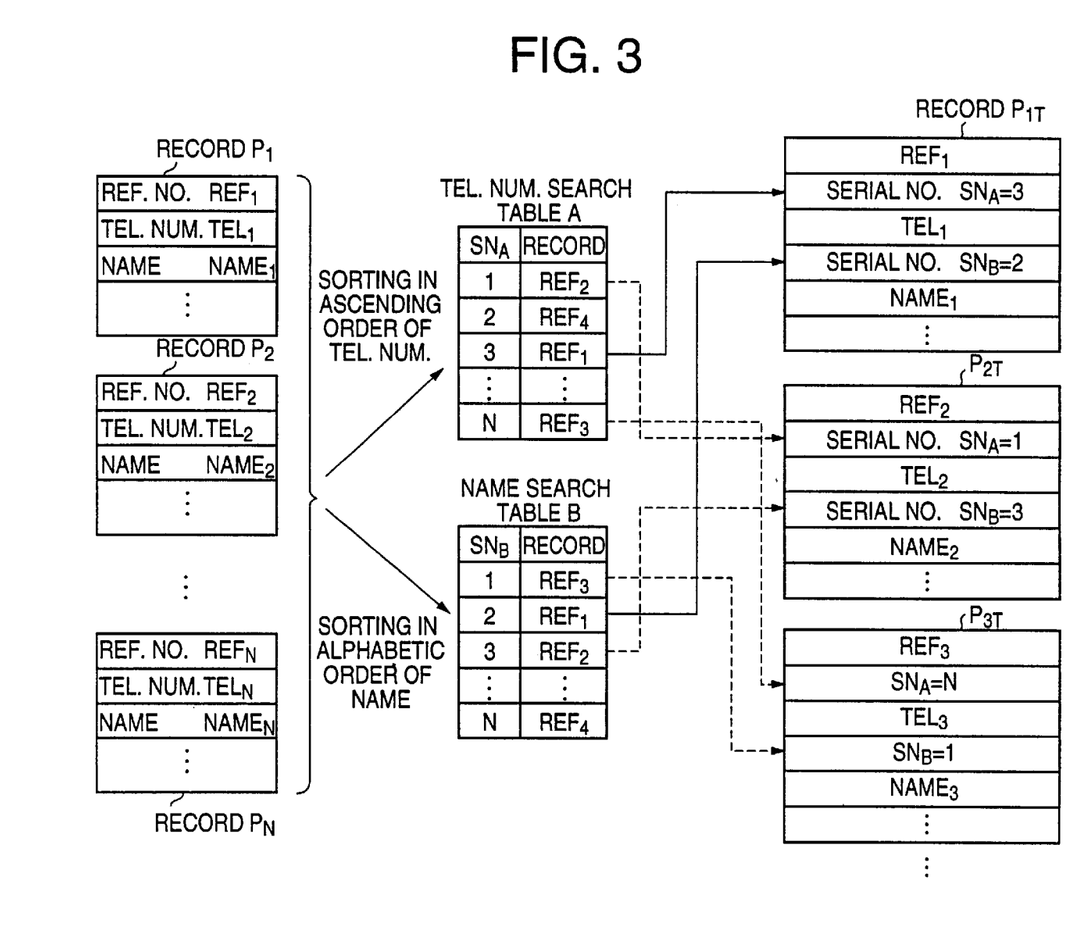
FIG. 3 is a diagram illustrating an example of the process of producing search tables according to the embodiment.

As illustrated in FIG. 3, it is assumed that N records of phone directory data, $P_1$ to $P_N$, (hereinafter each called "a record") are stored. For simplicity, it is further assumed that the reference number REF is stored in the first area; the telephone number TEL is stored in the second area; and the name NAME is stored in the third area. These pieces of data are sorted in ascending order of telephone number, thereby producing a telephone number search table A. Similarly, the pieces of data are sorted in alphabetic order of name, thereby producing a name search table B.

For example, when having sorted the telephone numbers $TEL_1$ to $TEL_N$ of the records $P_1$ to $P_N$ in ascending order, it is assumed that the obtained order is $TEL_2$, $TEL_4$, $TEL_1$, ... $TEL_3$. In this case, the N records stored in the telephone number search table A are rearranged in the order of reference numbers $REF_2$, $REF_4$, $REF_1$, ... $REF_3$, whereby these records are sequentially given serial numbers $SN_A$=1, 2, 3, ... N. Similarly, when having alphabetically sorted the names $NAME_1$ to $NAME_N$ of the records $P_1$ to $P_N$, it is assumed that the obtained order is $NAME_3$, $NAME_1$, $NAME_2$, ... $NAME_4$. In this case, the N records stored in the name search table B are rearranged in the order of reference numbers $REF_3$, $REF_1$, $REF_2$, ... $REF_4$, whereby these records are sequentially given serial numbers $SN_B$=1, 2, 3, ... N. When having completed the sort for each search table in this way, the respective serial numbers $SN_A$ and $SN_B$ of the telephone number search table A and the name search table B are stored in the second and fourth areas of each record.

Taking the record $P_1$ as an example, in the telephone number search table A, its telephone number $TEL_1$ is located on the 3rd line. Therefore, the serial number $SN_A$=3 is stored in the second area of the telephone number search table A. In the name search table B, the name is located on the 2nd line. Therefore, the serial number $SN_B$=2 is stored in the fourth area of the name search table B. Other records are similarly processed. In this way, there are produced the N records of phone directory data, $P_{1T}$ to $P_{NT}$, having the search tables added thereto.

In the case where the N records of phone directory data, $P_{1T}$ to $P_{NT}$, having the search tables added thereto are stored in the phone directory data memory 103 of the mobile telephone 10, it is possible to display the telephone numbers of the N records on the display 105 in ascending order by only referring to: 1) the serial number $SN_A$ located on the second area of each record PT1–PTN; 2) a search table produced in the process of producing the records $P_{1T}$ to $P_{NT}$ from the records $P_1$ to $P_N$; or 3) the telephone number search table A that is produced from the records $P_{1T}$ to $P_{NT}$. Also, only by referring to the search table serial number $SN_B$ located in the fourth area for each record, it is possible to sequentially display the N names in alphabetic order.

The phone directory data $P_1$ to $P_N$ illustrated in FIG. 2A and the phone directory data $P_{1T}$ to $P_{NT}$ having the search tables added thereto which is illustrated in FIG. 2B are selectively transferred from the computer 20 to the mobile telephone 10. This selection criterion is determined depending on the extent to which the above-described search table production processing affects the processing speed of the mobile telephone 10. Specifically, as will be described later, several things can be used as the indexes, including the proportion in which the processor 102 of the mobile telephone 10 is presently occupied, the number of registered records in the phone directory data, the number of search tables, and the transmission speed of the serial interface. The transfer control flows that are executed by the mobile telephone 10 and the computer 20 will hereafter be explained in detail.

CONTROL AT MOBILE TELEPHONE

Here, an explanation will be given of a case where a user accumulates phone directory data in the phone directory data memory 202 of the computer 20, and this phone directory data is transferred to the mobile telephone 10 via the serial interface.

Figure 4:
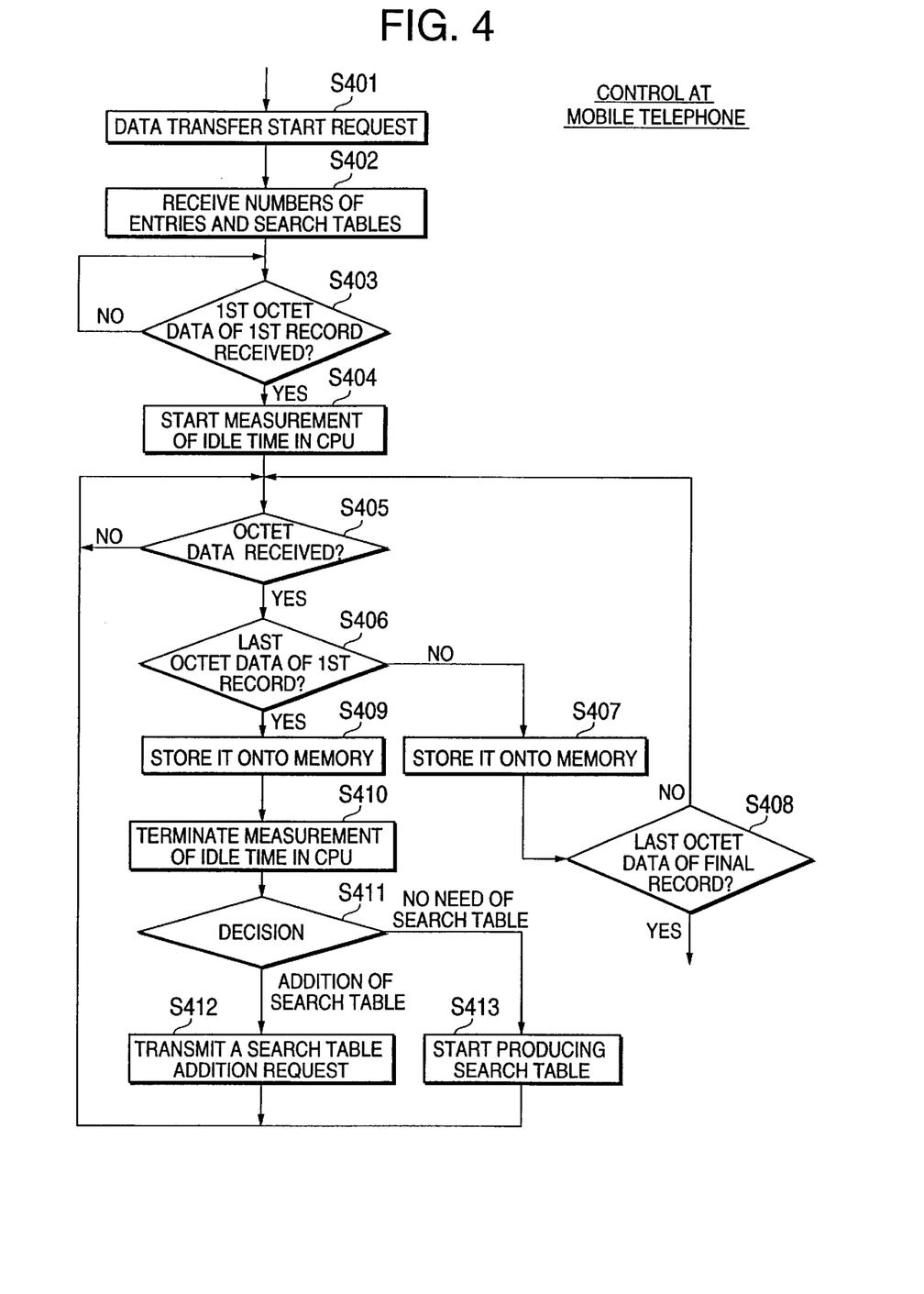
FIG. 4 is a flow chart illustrating the data transfer control operation of a mobile telephone according to the above-described embodiment.

Referring to FIG. 4, the mobile telephone 10 is connected to the computer 20 via the serial interface, whereby the user of the mobile telephone 10 operates the keypad 106 to request for starting the transfer of data (step S401). After receiving the number of registered records and the number of search tables in the phone directory data to be received from the computer 20 in response to the request for starting the transfer of data (step S402), the mobile telephone 10 waits for 1st-octet data of the first record in the phone directory data from the computer 20 (step S403). In the case where the number of search tables is preset, it is not necessary to receive the number of search tables from the computer 20. Further, if the upper limit number of registered records is preset, it becomes also unnecessary to receive the number of registered cases from the computer 20.

Upon receipt of the 1st-octet data of the first record (YES in step S403), the processor 102 stores this 1st-octet data onto the phone directory data memory 103 and starts a timer for measuring idle time of the processor 102 (step S404). Further, upon receipt of the next octet data (YES in step S405), it is determined whether it is final octet data of the first record (step S406).

If this next octet data is not final octet data of the first record yet (NO in step S406), that octet data is stored onto the phone directory data memory 103 (step S407). Then, the first processor 102 of the mobile telephone 10 determines whether that octet data is final octet data of the final record (step S408). In a case where that octet data is not final octet data of the final record (NO in step S408), the control flow is returned to the step S405 in which it is determined whether the mobile telephone 10 receives next octet data. When sequentially receiving octet data of the first record and storing it in this way, the final octet data is received (YES in step S406). When the mobile telephone 10 stores this final octet data (step S409), the timer is stopped and the measurement of the idle time of the CPU is terminated (step S410).

Subsequently, at the mobile telephone 10, it is determined whether the processor 102 should produce search tables or leave this task to the computer 20 depending on the measured idle time of the processor 102, the number of registered records in the phone directory data, the number of search tables, the transmission speed of the serial interface, and the like (step S411). Such a decision may be made by comparing the measured idle time to a predetermined threshold. If the measured idle time is larger than the predetermined threshold, it will be determined that the processor 102 has the processing power enough large to produce desired search tables.

The decision criterion in the step S411 is determined depending on whether the mobile telephone 10 can produce search tables from the phone directory data in parallel with the execution of other internal processing. In other words, it depends on whether the remaining processing power is large enough to execute the search-table production without largely delaying its internal processing. If the number of registered records in the phone directory data is large, it is better to produce search tables on the side of the computer 20 even when there is much idle time in the processor 102 of the mobile telephone 10. It is the same with cases where the number of search tables is large and/or the transmission speed of the serial data is high.

Conversely, in the cases where the idle time of the processor 102 is sufficiently long due to a lesser number of data records and so the processor 102 has enough time to produce search tables due to the low transfer speed of data, it is desirable to receive the phone directory data with no search tables added thereto (see FIG. 2A) from the computer 20. This is because a total amount of the data decreases and the data-transfer period of time also becomes shorter by the extent to which no search tables are added.

However, the number of search tables and the transfer speed of data are generally each preset. Further, if the upper limit number of registered records is preset, it is sufficient to take into account the idle time of the processor 102 only as the decision criterion that is used in the step S411. Or if the number of registered records can be determined depending on whether the production of search tables becomes problematic, it is possible to further simplify the decision processing.

According to the decision criterion, the processor 102 determines whether the addition of search tables should be requested from the computer 20 (step S411). If it is determined that the addition of search tables is needed, the processor 102 transmits a request for addition of search tables to the computer 20 (step S412). If it is determined that the addition of search tables is unnecessary, the processor 102 itself starts producing a search table (step S413).

Repeating the steps S405–S408 until the last octet data of the final record has been received, the mobile telephone 10 sequentially receives the phone directory data from the first octet data of the first record to the last octet data of the final record. When having requested the addition of search tables (S412), the mobile telephone 10 receives data as illustrated in FIG. 2B at the step S405. In a case where no search table is needed, the mobile telephone 10 receives data as illustrated in FIG. 2A. And the processor 102 of the mobile telephone 10 executes the search-table production processing in parallel with the execution of other internal processing.

CONTROL AT COMPUTER

Figure 5:
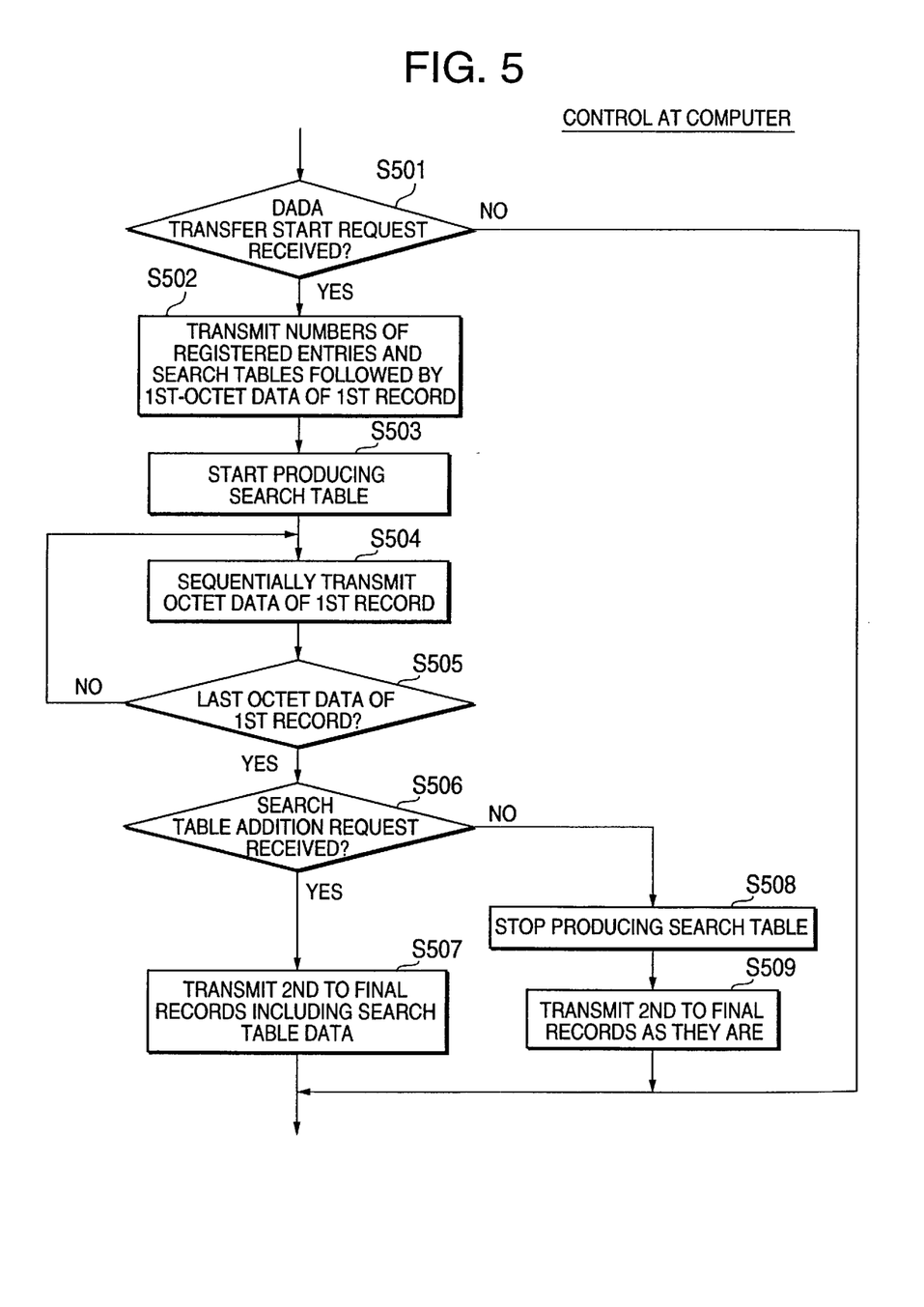
FIG. 5 is a flow chart illustrating the data transfer control operation of a computer according to the above-described embodiment.

Referring to FIG. 5, the computer 20 is connected to the mobile telephone 10 via the serial interface. When receiving a request for start of data transfer from the mobile telephone 10 (YES in step S501), the computer 20 transmits the number of registered records and the number of search tables in the phone directory data stored in the phone directory data memory 202 to the mobile telephone 10, and subsequently transmits 1st octet data of the first record of the phone directory data (step S502). Thereafter, the processor 201 starts the search-table production processing (step S503).

Subsequently, the processor 201 sequentially reads out octet data (the 1st octet data to last octet data) of the first record from the phone directory data memory 202, and sequentially transmits them to the mobile telephone 10 via the serial interface (steps S504 and S505). Upon completion of the transmission of the last octet data of the first record (YES in step S505), the processor 201 determines whether the request for addition of search tables has been received from the mobile telephone 10 (step S506).

In the case where the mobile telephone 10 has requested the addition of search tables (YES in step S506), the computer 20 transmits the second and thereafter records including data of search tables in the phone directory data to the mobile telephone 10 (step S507). In the case of the format illustrated in FIG. 2B, for each record after the first record, the reference number is transmitted at the timing of the 1st octet area before the telephone-number search table serial number, telephone-number data, name-search table serial number, and name data are sequentially transmitted at the timings of 2nd to 9th octet areas, respectively.

In a case where the mobile telephone 10 has not requested the addition of search tables (NO in step S506), the computer 20 stops the production of search tables (step S508), and transmits the second and thereafter records in the phone directory data memory as they are to the mobile telephone 10 (step S509). In the case of the format illustrated in FIG. 2A, for each record after the first record, the reference number is transmitted at the timing of the 1st octet area before telephone-number data, and name data are sequentially transmitted at the timings of 2nd to 7th octet areas, respectively.

Figure 6:
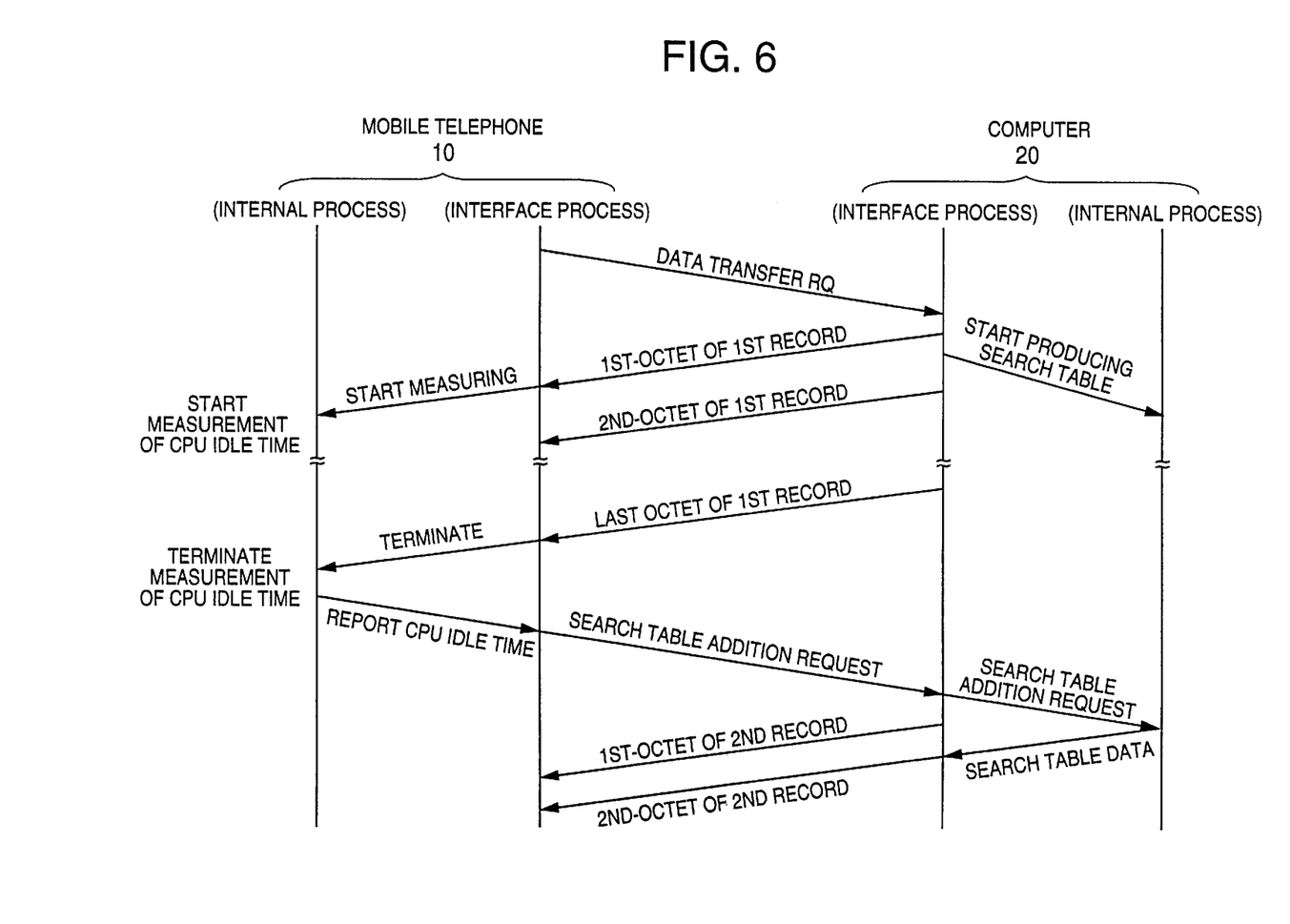
FIG. 6 is a diagram illustrating a sequence in which phone directory data having search tables added thereto is transferred from the computer to the mobile telephone.

As shown in FIG. 6, the reason why two processes (internal process and interface process) have been described in each of the mobile telephone 10 and the computer 20 is that the processing of each CPU is multi-tasked. Especially, regarding the interface processing, the processing periods of time differ greatly depending on the difference in performance between the interface 107 and the interface 206.

When connecting the mobile telephone 10 to the computer 20 and requesting the start of the transfer of data by the keypad 106, the interface process transmits the request for the start of the transfer of data to the computer 20. In response thereto, the interface process of the computer 20 transmits 1st octet data of the first record in the phone directory data to the mobile telephone 10 while this interface process requests search tables from the internal process of the computer 20. As a result of this, the internal process of the computer 20 starts producing search tables. Here, it is assumed that, even when the number of registered records is large, the number of registered records is not transmitted to the mobile telephone 10 if there is enough idle time in the processor 102 of the mobile telephone 10 because it is determined that the mobile telephone 10 can produce search tables. Further, it is assumed that the number of search tables and the transmission speed are determined beforehand and therefore they are not transmitted to the mobile telephone 10.

On the other hand, when having received 1st octet data of the first record, the interface process of the mobile telephone 10 stores the received 1st-octet data and also instructs the internal process to start the measurement of idle time of the processor 102. Thereafter, the interface process of the computer 20 sequentially transmits the phone directory data of the first record to the mobile telephone 10 in such a way as 2nd octet data, 3rd octet data, . . . of the first record. This first record data is transmitted unconditionally using the format illustrated in FIG. 2A.

When the interface process of the mobile telephone 10 receives a last octet data of the first record, the interface process instructs the internal process to terminate the measurement of idle time of the processor 102. In response thereto, the internal process immediately ends the measurement of the idle time and informs the measured idle time of the interface process. As described previously, the interface process of the mobile telephone 10 makes a decision on whether it interiorly executes the search-table production or it requests the data that has been calculated in the computer 20 depending on the measured idle time data of the processor 102.

Specifically, in a case where the measured idle time data of the processor 102 is larger than a prescribed threshold value, the interface process determines that there is a power that is large enough to produce search tables, whereby search tables are produced in charge of the internal process of the mobile telephone 10. On the other hand, in a case where the measured idle time data of the CPU is not larger than the prescribed threshold value, the interface process determines that there is no sufficient power in the processor 102 and that, therefore, producing search tables in charge of the internal process will have a large effect on other processing (the communication control, the data processing, and the like). As a result of this, the production of search tables is left to the computer 20. This prescribed threshold value is determined depending on whether it is possible to produce search tables from the phone directory data in parallel with the internal processing of the mobile telephone 10, as described previously.

Here, assuming that the measured idle time data of the processor 102 is not larger than the prescribed threshold value and that, therefore, there is no sufficient power in the processor 102, the interface process of the mobile telephone 10 transmits a request for addition of search tables to the computer 20. In response to this request, the interface process of the computer 20 demands the addition of search tables from the internal process thereof, and then this internal process transmits search table data back to the interface process. The interface process transmits 1st octet data of the second record to the mobile telephone 10 and thereafter transmits search table data (here, the telephone-number search table) to the mobile telephone 10 as 2nd octet data of the second record. Thereafter, similarly, the interface process sequentially transmits data corresponding to each entry in the phone directory data to the mobile telephone 10 according to the data format illustrated in FIG. 2B.

Although in the above-described embodiment an explanation has been given of a case where the mobile telephone and the computer are combined with each other, it is apparent that the present invention can be applied to a system composed of information devices each having a phone directory function. Especially, the present invention is effective for mobile information equipment, the hardware of which a limitation is imposed on as in the case of the mobile telephone.

Also, although in the above-described embodiment a serial interface is used for connection between the mobile telephone and the computer, the present invention does not depend on a particular interface. As the interface for use in the present invention there can be also similarly used an interface using optical communication or an interface using radio communication as well as an interface based on the use of cable connection such as a general RS 232C interface. Further, the connection of the both apparatuses can be also similarly realized even with the use of a parallel interface that is used as a printer interface, and the like As described above in detail, when transferring data from a first information device (the computer 20 in the above-described embodiment) to a second information device (the mobile telephone 10 in the above-described embodiment), it is determined whether some spare power large enough to produce search tables exists in the second information device. If such power exists, data is transferred to the second information device. If no such power exists, search tables are produced in the first information device and data having such search tables added thereto is transferred to the second information device. In this way, the production of search tables can be left to the first information device as necessary. This makes it possible to avoid the excessive load resulting from the execution of the search processing and also avoid the delay of other processing due to the production of search tables that occurs on the second information device.

What is claimed is:

1. A method for transferring a plurality of units of data to be searched from a first device to a second device through an interface, each of the first and second devices having a search function, the method comprising the steps of:
   a) storing the plurality of units of data in the first device;
   b) determining whether the second device currently has enough processing power to produce a desired search table from the plurality of units of data; and
   c) transferring the plurality of units of data from the first device to the second device in such a way that the desired search table is added to the plurality of units of data when the second device does not currently have enough processing power to produce the desired search table from the plurality of units of data.

2. A method according to claim 1, wherein the step b) comprises the steps of:
   b-1) measuring idle time of a data processor of the second device before the plurality of units of data is transferred from the first device to the second device; and
   b-2) determining whether the second device currently has enough processing power to produce a desired search table from the plurality of units of data, based on at least the idle time measured.

3. A method according to claim 2, wherein in the step b-2), it is determined whether the second device currently has enough processing power to produce a desired search table from the plurality of units of data, based on the idle time measured, the number of the units of data, the number of desired search tables to be produced, and a transmission rate between the first and second devices.

4. A method according to claim 2, wherein the step b-1) comprises the step of:
  measuring the idle time of the data processor of the second device for a time period during which a first unit of data from a first data block to a last data block has been transferred from the first device to the second device, and the step b-2) comprises the step of:
  comparing the measured idle time with a predetermined threshold value;
  determining that the second device currently has enough processing power to produce a desired search table from the plurality of units of data when the measured idle time is larger than the predetermined threshold value; and
  determining that the second device does not currently have enough processing power to produce a desired search table from the plurality of units of data when the measured idle time is not larger than the predetermined threshold value.

5. A method according to claim 1, wherein the step c) comprises the steps of:
  c-1) transferring the plurality of units of data from the first device to the second device when it is determined that the second device currently has enough processing power to produce a search table from the plurality of units of data, wherein the search table is produced at the second device: and
  c-2) transferring the plurality of units of data having the search table added thereto from the first device to the second device when it is determined that the second device does not currently have enough processing power to produce a search table from the plurality of units of data, wherein the search table is produced at the first device.

6. A method according to claim 1, wherein the first device is an information processing device, the second device is a mobile communication device, and the plurality of units of data is phone directory data.

7. A system for transferring a plurality of units of data to be searched from a first device to a second device through an interface, each of the first and second devices having a search function, the first device comprising:
  a first storage for storing the plurality of units of data;
  a first searcher for producing a desired search table from the plurality of units of data in response to a search table production request from the second device; and
  a first data processor for transmitting the plurality of units of data to the second device when the search table production request has not been received and transmitting the plurality of units of data having the search table added thereto when the search table production request has been received, and the second device comprising:
  a second storage for storing the plurality of units of data;
  a second searcher for producing a desired search table from the plurality of units of data stored in the second storage; and
  a second data processor for determining whether processing power is enough to produce a desired search table from the plurality of units of data to be received from the first device, transmitting the search table production request to the first device to receive the plurality of units of data having the desired search table added thereto when the second device does not currently have enough processing power to produce the desired search table from the plurality of units of data.

8. A system according to claim 7, wherein the second device further comprises:
  a timer for measuring idle time of a data processor of the second device before the plurality of units of data is transferred from the first device to the second device,
  wherein the second data processor determines whether the second device currently has enough processing power based on at least the idle time measured.

9. A system according to claim 8, wherein, taking into account the number of the units of data, the number of desired search tables to be produced, and a transmission rate between the first and second devices, the second data processor determines whether the second device currently has enough processing power to produce a desired search table from the plurality of units of data.

10. A system according to claim 7, wherein the first device is an information processing device, the second device is a mobile communication device, and the plurality of units of data is phone directory data.

11. A mobile communication device having a function of communicating with an information processing device through an interface, comprising:
  a storage for storing a plurality of units of data;
  a searcher for producing a desired search table from the plurality of units of data stored in the storage; and
  a data processor for determining whether processing power is enough to produce a desired search table from the plurality of units of data to be received from the information processing device, transmitting the search table production request to the information processing device to receive the plurality of units of data having the desired search table added thereto when the processing power is not enough to produce the desired search table from the plurality of units of data.

12. A mobile communication device according to claim 11, further comprising:
  a timer for measuring idle time of a data processor of the second device before the plurality of units of data is transferred from the information processing device,
  wherein the data processor determines whether the processing power is enough based on at least the idle time measured.

* * * * *